United States Patent [19]

Zhang

[11] Patent Number: 5,183,506
[45] Date of Patent: Feb. 2, 1993

[54] MODIFIED FLUX COMPOSITION FOR CEMENT

[76] Inventor: Zhong M. Zhang, Shuang Gang, Nan Chang, Jiang Xi, China

[21] Appl. No.: 846,096

[22] Filed: Mar. 5, 1992

Related U.S. Application Data

[63] Continuation-in-part of Ser. No. 578,902, Sep. 7, 1990, abandoned, which is a continuation-in-part of Ser. No. 234,125, Aug. 19, 1988, abandoned.

[30] Foreign Application Priority Data

Aug. 19, 1987 [CN] China ................. 87/105757

[51] Int. Cl.$^5$ ................. C04B 7/02
[52] U.S. Cl. ................. 106/739; 106/765; 106/767; 106/768
[58] Field of Search ............. 106/765, 767, 768, 739

[56] References Cited

U.S. PATENT DOCUMENTS

| | | | |
|---|---|---|---|
| 3,879,214 | 4/1975 | Lowe et al. | 106/453 |
| 4,087,285 | 5/1978 | Kurz | 106/100 |
| 4,135,941 | 1/1979 | Skalny et al. | 106/102 |
| 4,337,316 | 6/1982 | Votava | 501/5 |
| 4,377,415 | 3/1983 | Johnson et al. | 106/90 |

FOREIGN PATENT DOCUMENTS 46-22765  4/1971  Japan.
55-158238 12/1980 Japan.

OTHER PUBLICATIONS

Saduakasov, "Advantages of Wollastonite as Cement Raw Material" CA 79(2):9202f.
O'Bannon, Dictionary of Ceramic Science and Engineering Plenum Press pp. 278, 261, 109.

*Primary Examiner*—Karl Group
*Attorney, Agent, or Firm*—David H. Semmes

[57] ABSTRACT

A flux composition for cement comprises mainly wollastonite. One of the compositions of the flux is wollastonite 99%, fluorite 5-15% and gypsum 30-35%. The flux is added during the preparation of the cement raw materials and comprises 1-10% of the admixture. Thus, the firing temperature firing time may be shortened, the consumption of coal may be decreased and manufacturing productivity of the cement may be improved. In addition, the compression strength and the binding strength of the cement are also improved.

6 Claims, No Drawings

MODIFIED FLUX COMPOSITION FOR CEMENT

This is a continuation-in-part of application Ser. No. 07/578,902, filed Sep. 7, 1990, now abandoned, which in turn is a continuation-in-part of application Ser. No. 07/234,125, filed Aug. 19, 1988, now abandoned.

BACKGROUND OF THE INVENTION

1. Field of the Invention

Flux composition additives for manufacturing cements.

2. Description of the Prior Art

| | |
|---|---|
| SKALNY | 4,135,941 |
| JOHNSON et al. | 4,377,415 |
| VOTAVA | 4,337,316 |
| KURZ | 4,087,285 |
| LOWE | 3,879,214 |
| Japan | 71/22,765 |
| Japan | 55-158,238 |

"Advantages of Wollastonite", CA79(2):9202F USSR, SADUAKASOV, A.S. "Cement and Concrete Product".

O Bannon Dictionary of Ceramic Science and Engr. (1984) pp 109,261 and 278.

SUMMARY OF THE INVENTION

A flux composition for manufacturing cement comprising mainly low grade wollastonite. The flux is added during the preparation of the cement raw materials and comprises 1-10% of the admixture. Thus, the firing temperature may be reduced, the firing time may be shortened and coal consumption decreased, while enhancing manufacturing productivity. As a result, the compression strength and the binding strength of the cement are correspondingly enhanced.

DESCRIPTION OF THE PREFERRED EMBODIMENTS

This invention relates to flux compositions for manufacturing cements.

In order to accelerate the formation of cement clinker, a small quantity of mineralizer is often added to the raw materials of cement. A composite mineralizer comprised of gypsum and fluorite has been developed in recent years which lowers the melting point of the cement raw materials. However, this composite mineralizer mixture may give rise to manufacturing defects, such as the "ring formation", and may also produce fluctuations in cement quality. Wollastonite is a mineral which has gained widespread application in various manufacturing processes, for example, it has been used as a component of ceramic material to greatly reduce firing temperature and firing time. To date, no one has attempted to use wollastonite as a main component of the composite mineralizer for cements.

An object of the invention is to develop a new mineralizer employing low-grade wollastonite so as to reduce the firing temperature of cement and shorten its firing time. This results in energy savings when manufacturing cements and improves overall productivity. For purposes of the present application, "low-grade wollastonite" contains 25%-70% by weight of calcium silicate minerals ($CaSiO_3$) which does not meet standard application requirements in industry. In other words, "low-grade wollastonite" is treated as waste in the prior art. "Low-grate wollastonite" is available on the market.

Wollastonite belongs to the class of calcium silicate minerals ($CaSiO_3$), having the chemical composition $Ca_3(Si_3)O_9$) wherein CaO is 48.3% and $SiO_2$ is 51.7% by weight. Since wollastonite has a needle structure, it may improve the strength of a ceramic body by improving the compression strength. Based on the successful application of wollastonite in ceramic use, the present invention utilizes wollastonite and compounds such as gypsum and fluorite, to develop novel fluxes for cement with the following compositions:

1. wollastonite 50-99% , tremolite 1-50%;
2. wollastonite 50-65% , fluorite 5-15%, gypsum 30-35%;
3. wollastonite 50-98%, fluorite 1-20%, slag 1-30%.

The individual flux components are crushed and ground into the desired particle sizes ranging from 60 to 160 mesh. In the preferred embodiment, particle sizes will range from 80 to 100 mesh.

According to the present invention, the flux is added to raw materials of cement. The flux, when admixed or blended with the cement raw materials, comprises 1-10% of the cement-flux admixture. Preferably, the flux will average 3-5% of the admixture. The strength of the cement will vary depending on the amount of flux added to the cement. The concentration of free CaO in the flux-cement admixture may be measured to determine the optimal percent value of flux to be added to the cement raw materials.

A first embodiment of invention was based on composition 2 above of the flux for cement, utilized the percentage of individual compounds as listed in Table 1. Clinker raw materials were ground to pellet sizes ranging from 15 to 30 mm in diameter, preferably 25 mm. The pellets were fired in an electric oven for 20 minutes at 1350° C. This firing temperature was approximately 100° C. lower than conventional firing temperatures. Further, the amount of time required to keep constant temperature throughout the firing period was reduced by 30%. The resultant clinker was then analyzed for its chemical composition, including mineral content (%). The results are shown in Table 2.

The slag cement was prepared using the clinker formed hereinabove. The weight ratio among clinker, slag and gypsum was set as: clinker; slag; gypsum=50:50:2. The physical properties of the resultant cement are shown in Table 3.

A second embodiment of the present invention utilized composition 3 (see above) of the flux for cement. The percentages of individual compounds are listed in Table 4. The raw material pellets were prepared as described hereinabove. In this second embodiment of the invention, the percent of both limestone and slag was held constant, while percent concentrations were adjusted for fluorite, gypsum and wollastonite, Firing time was again reduced to approximately 20 minutes at a high temperature. The general chemical composition and mineral content of the resultant clinker is shown in Table 5.

The clinker, as prepared above, required only 20 minutes of firing, a reduction of 30% in firing time. This in turn conserved the amount of coal consumed during the firing process. The ratio for the cement mixture was: clinker prepared: gypsum=100: 4, and in preparing the slag cement the ratio was: clinker: slag: gypsum=50:50:4. The physical properties of the cement are listed in Table 6.

The distinguished effectiveness of the embodiments in comparison with the prior art is shown in Table 7.

Therefore, using the flux of the invention in the production of cement may not only shorten the firing time, reduce the amount of coal consumption, improve the discharge of flue gas and reduce the "ring formation" in the oven but, also, increase the compression strength of the cement by approximately 100Kg/cm2 or more, and increase the binding strength of the cement by 10Kg/cm2 or more.

Based on the above Composition 1 of the flux for cement, (wollastonite 50-99%, tremolite 1-50%), the percentages of individual compounds are listed in Table 8. The raw material pellets were prepared in sizes ranging from 12 to 14 mm in diameter. The pellets were fired in a kiln.

The general chemical composition and mineral content of the resultant clinker is shown in Table 9, in comparison with a control example in which no flux of the invention was used.

Table 10 shows the physical properties of the clinker.

TABLE 1

| Component | Design % | Rate of ignition loss % | $SiO_2$ % | $Al_2O_3$ % | $Fe_2O_3$ % | CaO % | MgO % | $CaF_2$ % | $SO_2$ % | Other % | Total % |
|---|---|---|---|---|---|---|---|---|---|---|---|
| Limestone | 66.50 | 28.74 | 0.86 | 0.15 | 0.05 | 36.08 | 0.49 | | | 0.13 | 66.50 |
| Clay | 12.50 | 0.90 | 8.26 | 1.90 | 0.78 | 0.05 | 0.31 | | | 0.30 | 12.50 |
| Iron powder | 2.00 | | 0.25 | 0.06 | 1.35 | 0.10 | 0.06 | | | 0.18 | 2.00 |
| Coal | 13.00 | 9.96 | 1.69 | 0.83 | 0.24 | 0.17 | 0.06 | | | 0.05 | 13.00 |
| Flux | 6.00 | 0.94 | 0.72 | 0.03 | 0.01 | 2.16 | 0.03 | 0.76 | 1.26 | 0.09 | 6.00 |
| Total | 100 | 40.54 | 11.78 | 2.97 | 2.43 | 38.56 | 0.95 | 0.76 | 1.26 | 0.75 | 100 |
| Raw Material Clinker | 100 | | 19.81 | 4.99 | 4.09 | 64.85 | 1.60 | 1.28 | 2.12 | 1.26 | 100 |

Black Raw Material Rate: KH = 0.98, N = 2.18, P = 1.22

Note:
KH—Saturation coefficient of lime
N—Rate of silice acid
P—Rate of iron

TABLE 2

| Rate of ignition loss | $SiO_2$ | $Al_2O_3$ | $Fe_2O_3$ | CaO | MgO | Total (%) | f-CaO | KH | n | p | $C_3S$ | $C_2S$ | $C_3A$ | $C_4AF$ |
|---|---|---|---|---|---|---|---|---|---|---|---|---|---|---|
| 1.76 | 20.32 | 6.17 | 4.69 | 65.85 | 1.25 | 100.00 | 2.02 | 0.91 | 1.87 | 1.32 | 56.37 | 15.75 | 8.40 | 14.26 |

TABLE 3

| Specific surface ($cm^2/g$) | Fineness (%) | Water quantity added at standard consistency (%) | set time Initial (hr, min) | set time Ending (hr, min) | Safety | Compression strength ($kg/cm^2$) 3 day | 7 day | 28 day | Bending strength ($kg/cm^2$) 3 day | 7 day | 28 day |
|---|---|---|---|---|---|---|---|---|---|---|---|
| 3160 | 7 | 21.5 | 1.30 | 3.20 | Acceptable | 307 | 523 | 648 | 59.00 | 74.50 | 89.50 |

TABLE 4

| Component | Design % | Rate of ignition loss % | $SiO_2$ % | $Al_2O_3$ % | $Fe_2O_3$ % | CaO % | MgO % | $CaF_2$ % | $SO_3$ % | Other % | Total % |
|---|---|---|---|---|---|---|---|---|---|---|---|
| Limestone | 67.50 | 28.25 | 1.04 | 0.49 | 0.16 | 36.21 | 0.37 | | | 0.98 | 67.50 |
| Slag | 17.00 | 3.11 | 8.16 | 3.08 | 0.82 | 0.87 | 0.24 | | | 0.72 | 17.00 |
| Coal | 8.00 | 6.08 | 1.05 | 0.49 | 0.10 | 0.07 | 0.06 | | | 0.14 | 8.00 |
| Flux | 7.50 | 0.87 | 0.48 | 0.02 | 0.01 | 2.47 | 0.07 | 0.60 | 1.39 | 1.59 | 7.50 |
| Total | 100 | 38.31 | 10.73 | 4.09 | 1.09 | 39.62 | 0.74 | 0.60 | 1.39 | 3.43 | 100 |
| Raw Material Clinker | 100 | | 17.40 | 6.63 | 1.77 | 64.22 | 1.20 | 0.97 | 2.25 | 5.56 | 100 |

Black Raw Material Rate: KH = 1.06, N = 2.07, P = 3.74

Note:
KH—Saturation coefficient of lime
N—Rate of silice acid
P—Rate of iron

TABLE 5

| nnn | $SiO_2$ | $Al_2O_3$ | $Fe_2O_3$ | CaO | MgO | Sum (%) | f-CaO | KH | n | p | $C_3S$ | $C_2S$ | $C_3A$ | $C_4AF$ |
|---|---|---|---|---|---|---|---|---|---|---|---|---|---|---|
| 1.32 | 18.82 | 5.85 | 2.02 | 63.94 | 1.18 | 93.13 | 3.44 | 0.95 | 2.39 | 2.90 | 60.78 | 8.10 | 12.07 | 6.14 |

TABLE 6

| material | Specific surface (cm²/g) | Fineness (%) | Water quantity added at standard consistency (%) | set time Initial (hr, min) | set time Ending (hr, min) | Safety | Compression strength (kg/cm²) 3 day | Compression strength (kg/cm²) 7 day | Compression strength (kg/cm²) 28 day | Bending strength (kg/cm²) 3 day | Bending strength (kg/cm²) 7 day | Bending strength (kg/cm²) 28 day |
|---|---|---|---|---|---|---|---|---|---|---|---|---|
| Clinker | 3310 | 65 | 22.5 | 2.10 | 4.31 | Acceptable | 342 | 484 | 646 | 59 | 68 | 85 |
| slag | 3215 | 7 | 22.5 | 2.50 | 5.42 | Acceptable | 129 | 256 | 462 | 33 | 61 | 82 |

TABLE 7

| No. | Title | Unit | Prior Art | Embodiment | Note |
|---|---|---|---|---|---|
| 1. | Heat consumption | kcal/kg | 1174 | 754 | Reduction 35.7% |
| 2. | Ignition loss | % | 40 | 36 | Average reduction 4% |
| 3. | Firing time of clinker at high temperature | Min | 30 | 20 | Less 33.3% |
| 4. | Strength | kg/cm² | Compressing strength 527 | Compressing strength 646 | Increasing 119 Increasing 17 |
| 5. | Kiln sintering | | Bending strength 68 Ring forming and lumping easily | Bending strength 85 Hardly lumping | |
| 6. | Draining of flue gas | | Black | White with black | |
| 7. | Time period for settling safety | Day | 15 | 7 | Less 8 days |
| 8. | Grindability | | Solid and compact, hard for grinding | Fragile, grinding easily | |

TABLE 8

| Component | Rate of ignition loss % | SiO₂ % | Al₂O₃ % | Fe₂O₃ % | CaO % | MgO % | Other % | Total % |
|---|---|---|---|---|---|---|---|---|
| Limestone | 30.36 | 1.99 | 0.22 | 0.15 | 38.88 | 0.39 | 1.21 | 73.2 |
| Clay | 0.33 | 4.43 | 0.72 | 0.36 | 0.07 | 0.06 | 0.03 | 6.00 |
| Iron powder | 0.11 | 0.88 | 0.19 | 1.53 | 0.04 | 0.03 | 0.22 | 3.00 |
| Coal | 7.49 | 4.00 | 2.31 | 0.63 | 0.08 | 0.11 | 0.18 | 14.80 |
| Flux | 0.16 | 1.34 | 0.01 | 0.02 | 1.06 | 0.24 | 0.17 | 3.00 |
| Total Raw Material | 39.22 | 12.19 | 4.13 | 2.62 | 40.13 | 0.83 | 1.81 | 100 |
| Clinker | 0 | 20.06 | 6.79 | 4.31 | 66.03 | 1.37 | | |

Black Raw Material Rate: KH = 0.95, N = 1.8, P = 1.8
Note:
KH—Saturation coefficient of lime
N—Rate of silice acid
P—Rate of iron

TABLE 9

(%)

| Flux of the invention added | Rate of ignition loss | SiO₂ | Al₂O₃ | Fe₂O₃ | CaO | MgO | Total | f-CaO | KH | KH⁻ | n | p | C₃S | C₂S | C₃A | C₄AF |
|---|---|---|---|---|---|---|---|---|---|---|---|---|---|---|---|---|
| 0 | 0.42 | 19.37 | 6.21 | 4.62 | 64.51 | 0.98 | 98.15 | 2.92 | 0.94 | 0.89 | 1.79 | 1.34 | 49.32 | 18.32 | 8.62 | 14.04 |
| 3 | 0.45 | 19.98 | 5.81 | 4.53 | 65.13 | 0.97 | 98.65 | 1.79 | 0.94 | 0.91 | 1.93 | 1.28 | 55.42 | 15.46 | 7.71 | 13.77 |

TABLE 10

| Flux of the invention added (%) | Specific surface (cm³/g) | Fineness (%) | consistency (%) | set time initial (hr, min) | set time Ending (hr, min) | Safety | Compression strength (kg/cm³) 3 day | Compression strength (kg/cm³) 7 day | Compression strength (kg/cm³) 28 day | Bending strength (kg/cm³) 3 day | Bending strength (kg/cm³) 7 day | Bending strength (kg/cm³) 28 day |
|---|---|---|---|---|---|---|---|---|---|---|---|---|
| 0 | 3030 | 5 | 23.50 | 1:56 | 3:01 | Unacceptable | 275 | 406 | 582 | 57 | 68 | 80 |
| 3 | 3210 | 5 | 23.75 | 3:15 | 4:20 | Acceptable | 437 | 592 | 756 | 75 | 90 | 97 |

I claim:

1. A composition for producing cement, comprising cement raw materials and 1-10% by weight of a flux composition, consisting essentially of by weight:

| low grade wollastonite | 50-99%, and |
|---|---|
| tremolite | 1-50%. |

2. A composition for producing cement, comprising cement raw materials and 1-10% by weight of a flux composition, consisting essentially of by weight

| low grade wollastonite | 50-65%, |
| --- | --- |
| flourite | 5-15%, and |
| gypsum | 30-35%. |

3. A composition for producing cement, comprising cement raw materials and 1-10% by weight of a flux composition, consisting essentially of

| low grade wollastonite | 50-98%, |
| --- | --- |
| flourite | 1-20%, and |
| slag | 1-30%. |

4. The composition for producing cement of claim 1 incorporating 3-5% by weight of the flux.

5. The composition for producing cement of claim 2 incorporating 3-5% by weight of the flux.

6. The composition for producing cement of claim 3 incorporating 3-5% by weight of the flux.

* * * * *